United States Patent [19]

Suzuki

[11] Patent Number: 5,731,098
[45] Date of Patent: Mar. 24, 1998

[54] SECONDARY CELL WITH TERMINAL CAP OF SAFETY STRUCTURE

[75] Inventor: Hisashi Suzuki, Kanagawa, Japan

[73] Assignee: Fuji Photo Film Co., Ltd., Kanagawa, Japan

[21] Appl. No.: 840,756

[22] Filed: Apr. 16, 1997

[30] Foreign Application Priority Data

Apr. 16, 1996 [JP] Japan .................. 8-094495

[51] Int. Cl.⁶ .............................. H01M 2/12; H01M 6/14
[52] U.S. Cl. .................. 429/53; 429/62; 429/94; 429/170
[58] Field of Search .................. 429/53, 54, 62, 429/94, 163, 170, 171, 175, 194, 178

[56] References Cited

U.S. PATENT DOCUMENTS

| | | | |
|---|---|---|---|
| 5,171,647 | 12/1992 | Dean et al. | 429/54 |
| 5,532,075 | 7/1996 | Alexandres et al. | 429/54 |
| 5,580,679 | 12/1996 | Tanaka | 429/171 X |

FOREIGN PATENT DOCUMENTS 8-153536   6/1996   Japan .................. H01M 10/38

*Primary Examiner*—Anthony Skapars
*Attorney, Agent, or Firm*—Sughrue, Mion, Zinn, Macpeak & Seas, PLLC

[57] ABSTRACT

A terminal cap for a cylinder type non-aqueous secondary cell, the terminal cap having a projection and a flange integrally formed, a side wall of the projection being formed with openings, each opening is defined by the following equation:

$$P = (Ro - Ri)/Ro$$

where P is set in the range of $-0.1 \leq P \leq +0.3$, Ro is a diameter of a circle composed of sides of the openings on the side of the top surface of the projection and Ri is a diameter of a circle composed of sides of the openings on the side of the flange, respectively when the sides are projected along the direction vertical to the surface of the flange.

13 Claims, 5 Drawing Sheets

SECONDARY CELL WITH TERMINAL CAP OF SAFETY STRUCTURE

This application is based upon Japanese Patent Application No. 8-94495 filed on Apr. 16, 1996, the entire contents of which area incorporated herein by reference.

BACKGROUND OF THE INVENTION a) Field of the Invention

The present invention relates to a high energy density cell safe and durable, and more particularly to a high energy density cylinder type cell with a safety structure and to its component.

b) Description of the Related Art

The internal pressure of a secondary cell rises if it is used in an abnormal state such as overcharge and throwing it into fire. In order to prevent breakage of the can of a cell to be caused by a rise of the internal pressure, the sealing member of a secondary cell has a safety valve and a vent hole. Conventional nickel-cadmium cells and nickel-hydrogen cells have a low energy density so that even an abnormal state occurs, the sealing member functions satisfactory.

A non-aqueous secondary cell using the recently developed technique of absorption and release of lithium has a high voltage of 3.6 and a high energy density. The non-aqueous secondary cell can be made compact. It also has a small self-discharge and is excellent in cycle performance so that it is expected to be widely used as the power sources of portable electronic apparatuses. However, because of a high energy density of this cell, a safety mechanism more reliable and precise has been desired heretofore.

SUMMARY OF THE INVENTION

It is an object of the present invention to provide a cylindrical non-aqueous secondary cell with a high energy density which has a safety mechanism for protecting it from an abnormal use such as inadvertently throwing it into fire.

According to one aspect of the present invention, there is provided a terminal cap for a cylinder type non-aqueous secondary cell, the terminal cap having a projection and a flange integrally formed, a side wall of the projection being formed with openings, each opening is defined by the following equation:

$$P = (Ro - Ri)/Ro$$

where P is set in the range of $-0.1 \leq P \leq +0.3$, Ro is a diameter of a circle composed of sides of the openings on the side of the top surface of the projection and Ri is a diameter of a circle composed of sides of the openings on the side of the flange, respectively when the sides are projected along the direction vertical to the surface of the flange.

It is possible to provide the structure of a terminal cap having no thrust force even when the cell contents are jetted out via a safety valve released in an abnormal state.

DETAILED DESCRIPTION OF THE PREFERRED EMBODIMENTS

Preferred embodiments of the invention will be described. The invention is not limited to only these embodiments.

A terminal cap for a cylinder type non-aqueous secondary cell has a projection and a flange integrally formed, a side wall of the projection being formed with openings, each opening is defined by the following equation:

$$P = (Ro - Ri)/Ro$$

where P is set in the range of $-0.1 \leq P \leq +0.3$, Ro is a diameter of a circle composed of sides of the openings on the side of the top surface of the projection and Ri is a diameter of a circle composed of sides of the openings on the side of the flange, respectively when the sides are projected along the direction vertical to the surface of the flange.

The terminal cap has at least two openings. A plurality of openings are disposed in rotation symmetry. The material of the terminal cap may be nickel-plated iron or stainless steel. P is preferably set in the range of $-0.01 \leq P \leq +0.10$. If the area of the openings when the terminal cap is projected along the horizontal direction is represented by Si and the area of the terminal cap when the terminal cap is projected along the direction vertical to the terminal cap is represented by So, a ratio Q of Si to So is set in the range of $0.03 \leq Q \leq 0.4$, or preferably set in the range of $0.04 \leq Q \leq 0.1$.

A cylinder type non-aqueous secondary cell comprises: an electrode group including a positive electrode, a negative electrode and a separator wound together; non-aqueous electrolyte; a can for accommodating the electrode group and the non-aqueous electrolyte; and a sealing member inclusive of the above-described terminal cap for sealing an open end of the can.

The sealing member may further comprise a positive temperature coefficient element, a current cutoff element and an explosion-proof valve.

Embodiments of the invention will be detailed in the following.

Figure 5:
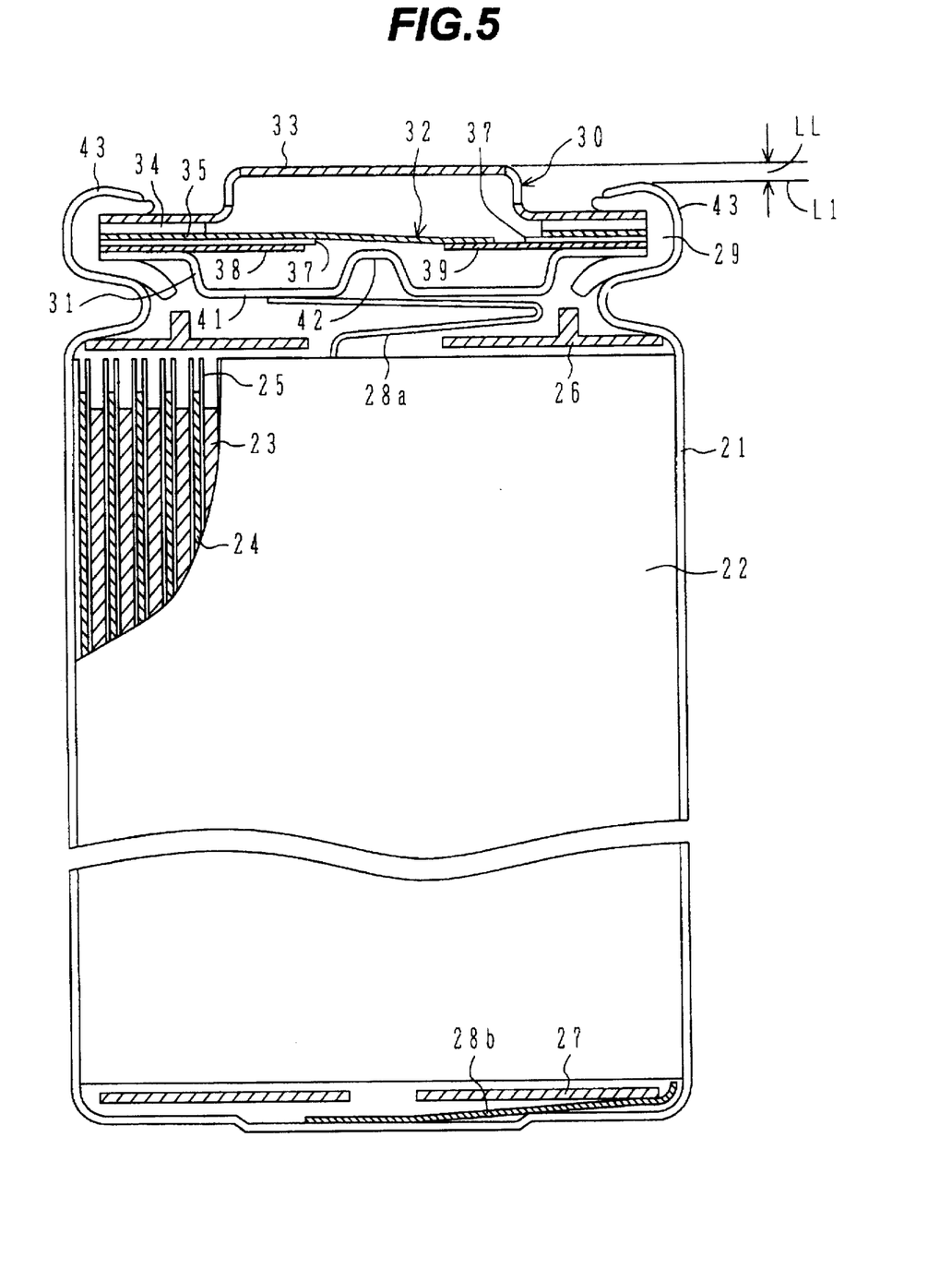
FIG. 5 is a cross sectional view of a cell.

FIG. 5 is a cross sectional view of a cylinder type cell. The shape of the cell may be a cylinder or a square. Electrode sheets 23 and 24 together with a separator 25 are wound to form an electrode group 22. This electrode group 22 is inserted into a cell can 21. The negative sheet 24 is connected via a negative lead plate 28b to the can 21. Electrolyte is permeated into the inside of the can 21 and the can is sealed with a terminal cap 33 to form a cell. The terminal cap 33 serves as the positive electrode terminal and is fitted in an upper opening of the can 21 by using a gasket 29. The positive sheet 23 is electrically connected via a positive lead plate 28a to the terminal cap 33. It is preferable to use a positive temperature coefficient (PTC) element 34 for the safety of the cell.

In a non-aqueous secondary cell, if the internal pressure of the cell rises by abnormality caused by some reasons, a safety value opens to release the internal pressure from an opening formed in the terminal cap. By releasing the internal pressure, explosion of the cell is prevented. However, if the area of the opening is small, the vent capacity is insufficient and the cell is exploded. With the configuration of a conventional terminal cap, the thrust force direction of air released from the inside of the cell contains components vertical to the cell so that a thrust force is generated. The shape of the terminal cap according to the embodiments of this invention is intended to solve this problem.

The terminal cap of the embodiments are designed to reduce the vertical components of air or liquid jetted out of the cell as much as possible, or preferably eliminate the vertical components completely.

Figure 1A:
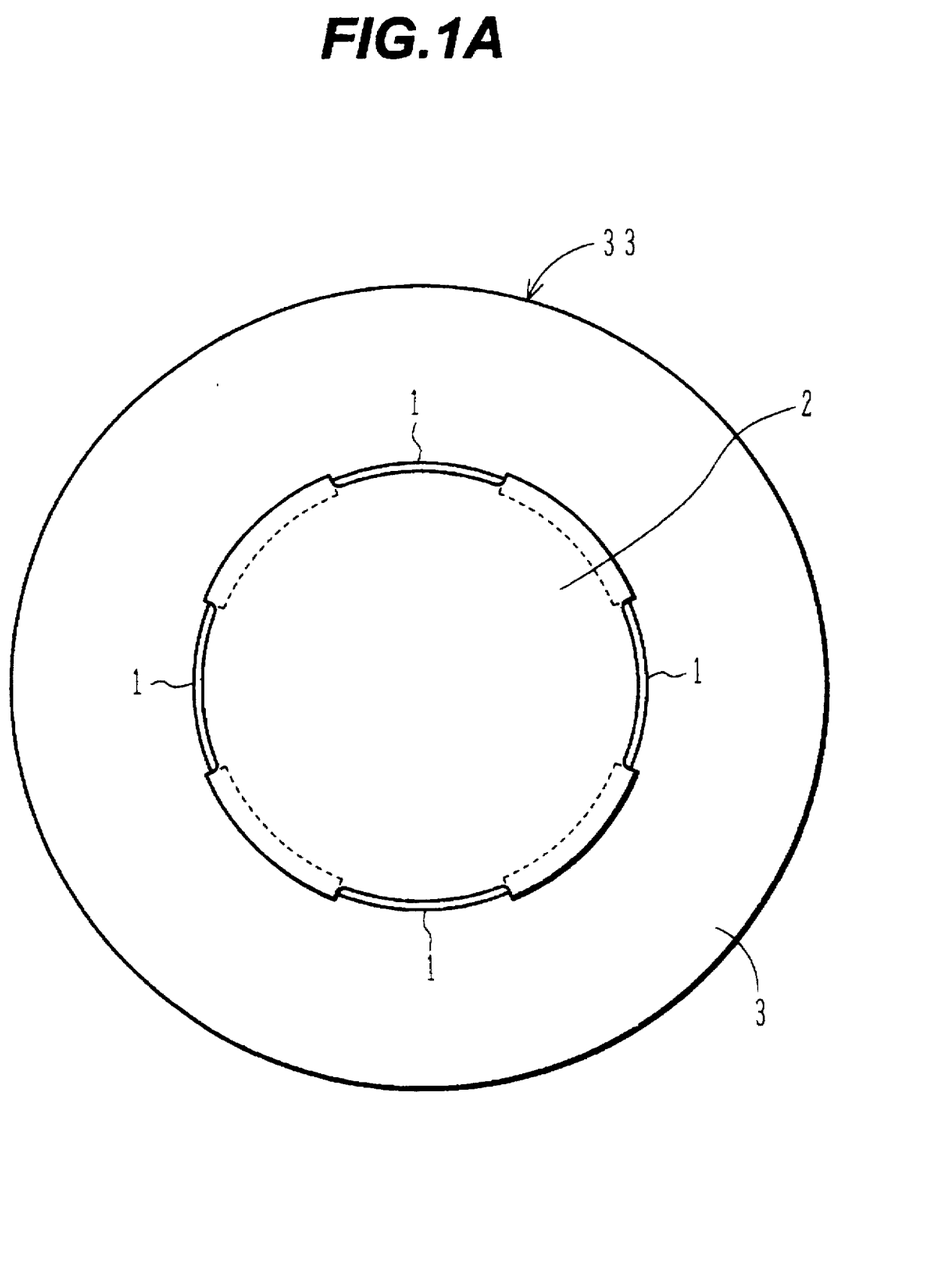
FIGS. 1A and 1B are plan views of terminal caps as seen along the vertical direction, according to an embodiment of the invention.
Figure 1B:
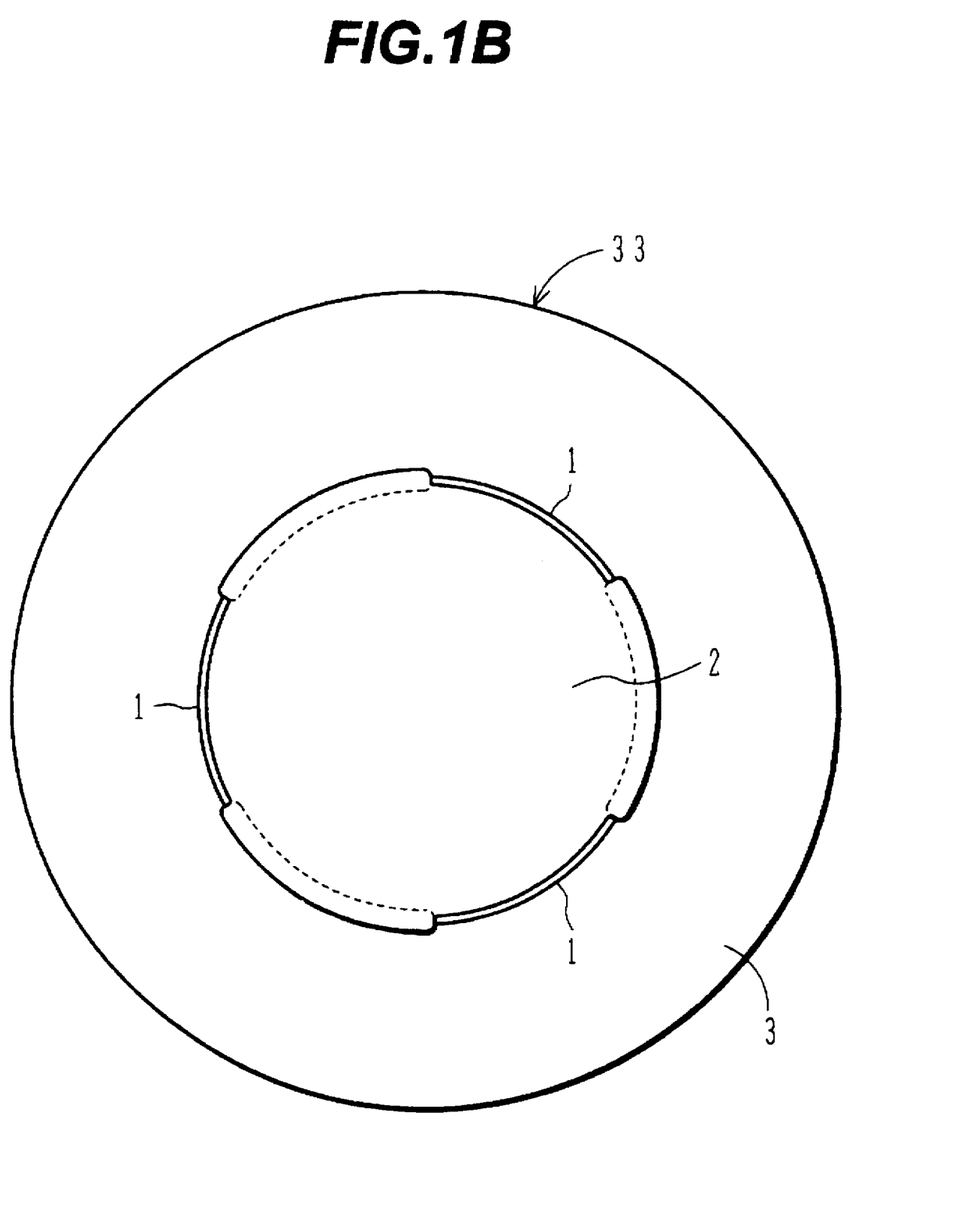

The embodiments will be described with reference to the accompanying drawings. FIG. 1A is a diagram showing a terminal cap 32 according to an embodiment, as viewed along the vertical direction (along the axial direction of the cylinder type cell). Reference numeral 1 represents an opening, reference numeral 2 represents the top surface of a projection, and reference numeral 3 represents a flange. The projection has the top surface 2 and a side wall, and the opening is formed in this side wall. The number of openings is set so that the abnormal internal pressure is released quickly. The number of openings is preferably two, and more preferably three or more. The terminal cap shown in FIG. 1A has four openings, and the terminal cap shown in FIG. 1B has three openings. The openings are formed in the side wall of the projection so that the thrust forces in the horizontal direction relative to the terminal cap (in the direction along the drawing sheet) are cancelled out as a whole. It is preferable to dispose the openings in a rotation symmetry.

Figure 2:
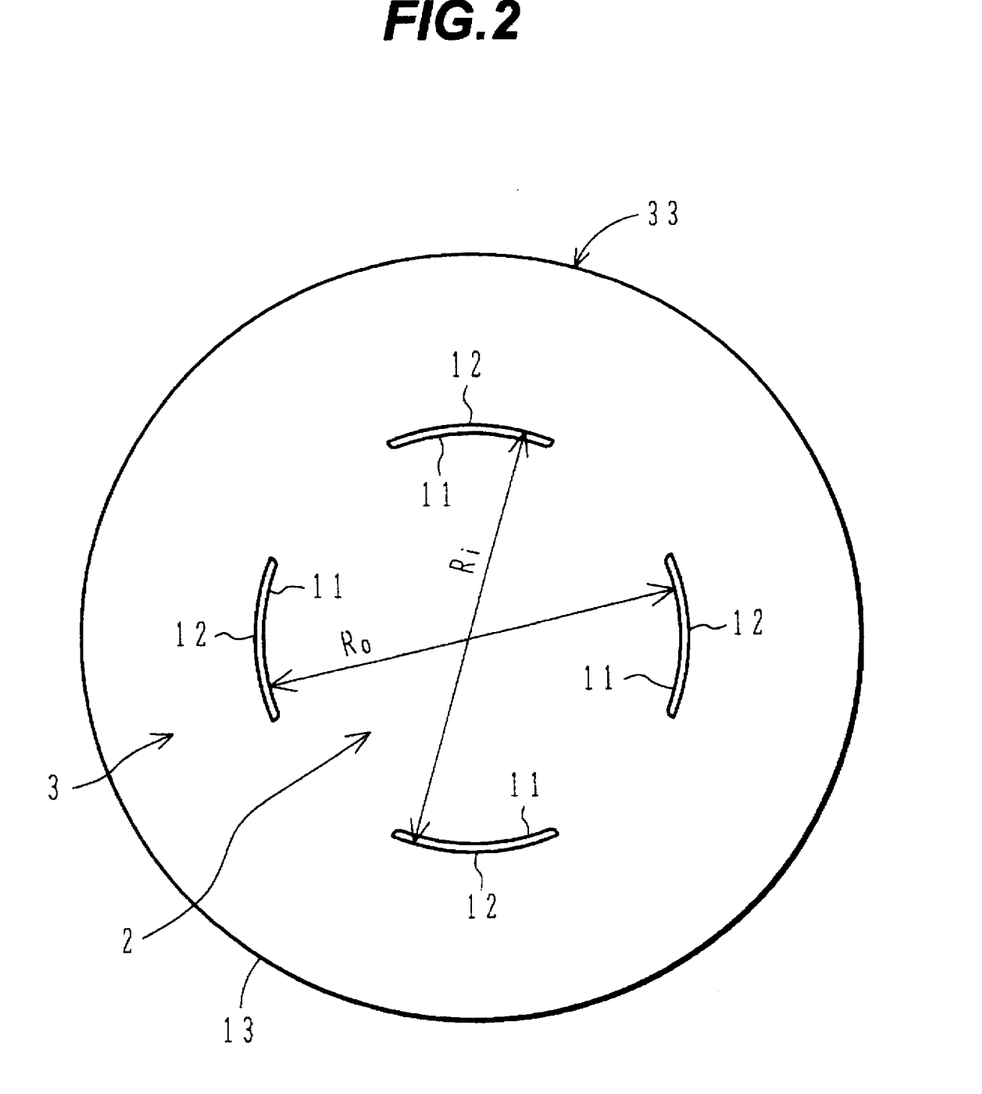
FIG. 2 is a projection view of the terminal cap shown in FIG. 1A as seen along the vertical direction.

FIG. 2 is a projection diagram of the terminal cap as viewed along the vertical direction. Reference numeral 11 represents one side of each of the four openings on the side of the top surface 2 of the projection, a circle constituted of these four sides 11 having a diameter of Ro. Reference numeral 12 represents the other side of each of the four openings on the side of the flange 3, a circle constituted of these four sides 12 having a diameter of Ri. The area So of the top the terminal cap in plan view is the area of an outermost circle 13 shown in FIG. 2. Ro and Ri are related to each other by the following equation:

$$P=(Ro-Ri)/Ro$$

where P is preferably $-0.1 \leq P \leq +0.3$, and more preferably $-0.01 \leq P \leq +0.10$.

Figure 3A:
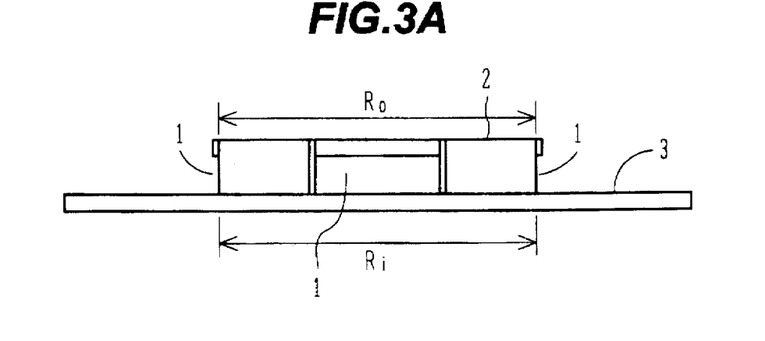
FIGS. 3A–3C and FIG. 4 are side views of terminal caps as seen along the horizontal direction, according to other embodiments of the invention.
Figure 3B:
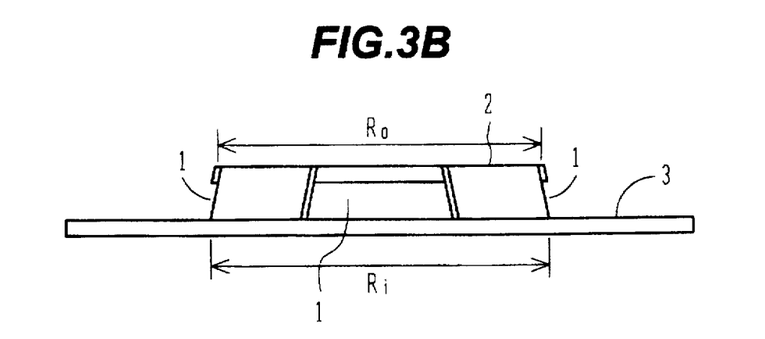
Figure 3C:
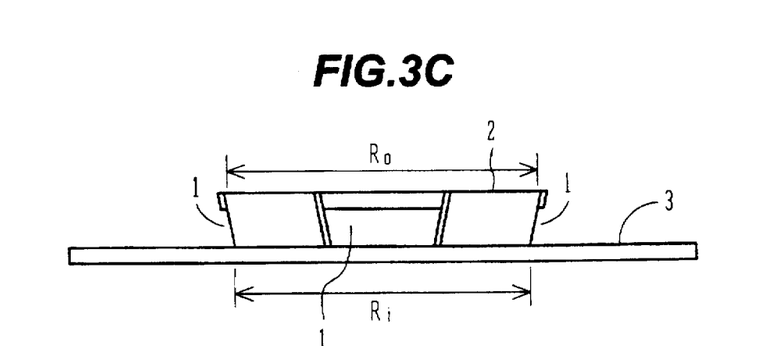

FIGS. 3A-3C are diagrams showing terminal caps as seen in the horizontal direction. FIG. 2 is a projection view of the terminal cap shown in FIG. 3B as seen along the vertical direction. Reference numeral 2 represents the top surface of the projection, reference numeral 3 represents the flange, and reference numeral 1 represents the opening. FIG. 3A shows a terminal cap with P=0 (Ro=Ri) and the thrust force from the opening is directed only in the horizontal direction. FIG. 3B shows a terminal cap with a negative P (Ro<Ri) and the thrust force from the opening is directed mainly in the horizontal direction and includes a small amount of upward components. FIG. 3C shows a terminal cap with a positive P (Ro<Ri) and the thrust force from the opening is directed mainly in the horizontal direction and includes a small amount of downward components. If P is smaller than -0.1, a large thrust force in the vertical direction is generated, whereas if P is larger than +0.3, a large resistance to a thrust force is generated increasing the explosion danger of the cell.

An area Si of the openings 1 means an opening area (for example, a rectangular area shown in FIG. 3A) of one opening 1 in a projection view of the terminal cap as seen along the horizontal direction, multiplied by the number of openings (e.g., four). The area Si of the terminal cap is an area of the terminal cap shown in FIG. 3A in a projection view as seen along the vertical direction, and is an area of the circle 13 shown in FIG. 2. If a ratio of Si to So is represented by Q, Q is preferably $0.03 \leq Q \leq 0.4$, and more preferably $0.04 \leq Q \leq 0.1$. If Q is 0.03 or smaller, a large resistance to a thrust force is generated increasing the explosion danger of the cell, whereas if Q is in excess of 0.4, the mechanical strength of the terminal cap lowers and the opening of the terminal cap is likely to be deformed.

Figure 4:
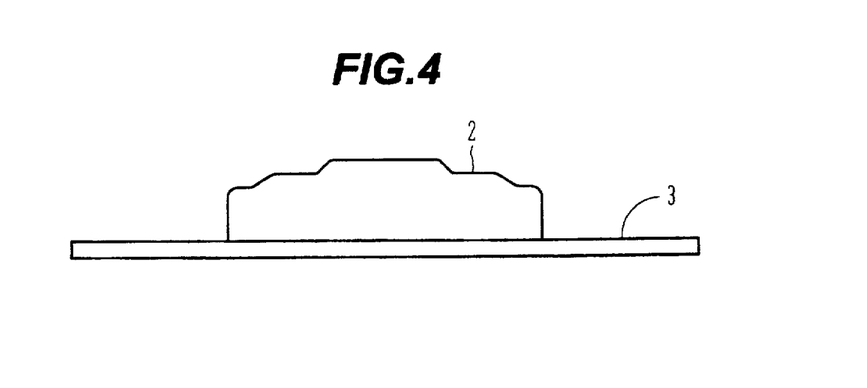

The top surface 2 of the projection is not necessarily flat as shown in FIGS. 3A-3C, but steps may be formed as shown in FIG. 4. If the top surface 2 of the projection is used as the positive electrode surface, the steps formed on the top surface 2 shown in FIG. 4 increase the contact reliability of the positive electrode.

As shown in FIG. 5, for the safety of the cell, a sealing member 30 is preferably formed to include the terminal cap 33, a PTC element 34, a current cutoff element 32, and an explosion-proof valve 31. The PTC element cuts off current when the temperature in the cell rises. The current cutoff element 32 has a lamination structure of a first conductive body 35, an intermediate insulating body 37 and a second conductive body 38. The second conductive body 38 is disposed on the side of the explosion-proof valve 31 and has a through hole formed therein. The first conductive body 35 is disposed on the side of the PTC element 35, i.e., on the side of the positive terminal cap 33 and has a through hole formed therein. The first and second conductive bodies are electrically connected near at a center 39 of the cell. The first conductive body 35 has a thinned portion at the periphery of the contact area 39. The explosion-proof valve 31 is so constructed that it can deform toward the direction opposite to the electrode group 22 side when the internal pressure rises and can push up the central contact area of the first conductive body 35 of the current cutoff element 32. It is preferable that the explosion-proof valve 31 is of a disk shape having a projected flat portion 41 projecting from near the periphery thereof toward the electrode group 22 side and that the projected flat portion 41 has an operating member capable of acting upon the central contact area 39 of the first conductive body 35 of the current cutoff element 32. It is also preferable that the explosion-proof valve 31 has a protrusion 42 directed toward the current cutoff element 32, the protrusion 42 being integrally formed at the central area of the projected flat portion 41 (e.g., as disclosed in JP-A 8-153536 which is herein incorporated by reference). As the internal pressure of the cell rises by abnormality, the deformed valve 31 breaks the contact area 39 between the first and second conductive bodies 35 and 38, and the internal pressure further rises, the thin portion of the valve 31 is broken to release the internal pressure to the outside. In this case, since the current cutoff element 32 is disposed near the explosion-proof valve 31 on the side opposite to the electrode group 22, even if spark is generated at the broken point of the contact area, explosion of the cell can be prevented because electrolyte vapor is hard to take fire.

It is preferable to connect contact areas of the conductive components of the sealing member of the lamination structure by welding. The welded contact areas of the conductive components are stable and highly resistant to impact forces applied externally by dropping the cell or other causes, and the safety mechanism can be made more reliable. For example, in order to connect the explosion-proof valve 31 and the first conductive body 35 of the current cutoff element 32, it is preferable to use laser welding or ultrasonic welding and JIS 1000 series aluminum.

It is preferable to dispose an upper insulating plate 26 between the electrode group 22 and the explosion-proof valve 31 in order to insulate the electrode group 22 from the can 21 or sealing member 30. It is also preferable to dispose a lower insulating plate 27 between the electrode group 22 and the electrode lead plate 28b in order to insulate the electrode group 22 from the can 21.

In addition to impact forces applied externally by dropping the cell or the like, the other cause of lowering the cell performance is deformation of the negative terminal cap and hence of the sealing member. In order to avoid this, it is preferable to set the step LL between the top surface of the terminal cap 33 and the upper periphery 43 of the can in the range from +1.0 mm to −0.5 mm with respect to the height L1 of the upper periphery 43 of the can. In this case, the step LL is set more preferably in the range from +0.5 mm to −0.3 mm, and particularly preferable to be set in the range from +0.15 mm to 0 mm. The plus means that the terminal cap 33 projects upward, and the minus means that the terminal cap 33 retracts downward. In this manner, the central downward projection of the sealing member 30 lowers by LL or smaller even if the cell is dropped and impact forces are applied thereto, so that a resistance increase or malfunction of the current cutoff element 32 can be prevented. If the step LL is set to +1.0 mm or larger, a resistance increase of the current cutoff element 32 becomes large and a malfunction may occur. If the step LL is set over −0.5 mm, connection to the external terminal becomes bad. The step LL may be adjusted by changing the thickness of an insulating ring disposed on the upper periphery 43 of the can or the thickness of a heat-shrinkable tubing on the insulating ring covering the can side wall and partial portions of the electrode surfaces. If the upper periphery 43 of the can is higher than the top surface of the terminal cap 33, it becomes difficult to weld a lead to the terminal cap 33. It is therefore preferable that the terminal cap 33 is higher than the upper periphery 43 of the can. The insulating ring is preferably paper or plastics, particularly polypropylene.

The electrode of the non-aqueous secondary battery may be formed by coating the depolarizing mix of electrode active materials on a support or current collector, or by compressing them in pellets. The depolarizing mix for positive and negative electrodes may comprise a conductivity-imparting agent, a binder, a dispersant, a filler, an ionic conductivity-imparting agent, a pressure increasing agent, and various types of addition agents.

The active materials for positive electrodes may be any materials which allow free absorption and release of a light metal. Lithium-containing transition metal oxides are preferably used as the positive electrode active materials, examples of which are $Li_xCoO_2$, $Li_xNiO_2$, $Li_xCo_aNi_{1-a}O_2$, $Li_xCo_bV_{1-b}O_2$, $Li_xCo_bFe_{1-b}O_2$, $Li_xMn_2VO_4$, $Li_xMnO_2$, $LiMn_2O_3$, $Li_xMn_bCo_{2-b}O_z$, $Li_xMn_bNi_{2-b}O_z$, $Li_xMn_bV_{2-b}O_z$, and $Li_xMn_bFe_{1-b}O_z$ (wherein x=0.05 to 1.2, a=0.1 to 0.9, b=0.8 to 0.98 and z=1.5 to 5).

The term "light metal" used herein means elements belonging to Group 1A (except for hydrogen) and Group 2A of Periodic Table, with lithium, sodium and potassium, in particular, lithium being preferred.

The active materials for negative electrodes may be any materials which allow free absorption and release of a light metal. Examples of such materials are preferably graphite (natural, artificially synthesized and vapor phase grown graphite), coke (derived from coal or petroleum), calcined products of organic polymers (resins or fibers of polyacrylonitrile, furan resins, cresol resins, phenolic resins), calcined products of mesophase pitch, metal oxides, metal chalcogenides, and lithium-containing transition metal oxides and chalcogenides.

Oxides and chalcogenides are preferably made of a material or a combination of materials selected from a group consisting of Ge, Sn, Pb, Bi, Al, Ca, Si and Sb. Amorphous oxides and chalcogenides added with network formers such as $SiO_2$, $B_2O_3$, $P_2O_5$, $Al_2O_3$ and $V_2O_5$ are more preferable. These materials may be stoichiometric compounds or non-stoichiometric compounds.

Preferable examples of such compounds are enumerated in the following only for illustrative purpose.

GeO, $GeO_2$, SnO, $SnO_2$, $SnSiO_2$, PbO, SiO, $Sb_2O_5$, $Bi_2O_3$, $Li_2SiO_3$, $Li_4Si_2O_7$, $Li_2GeO_3$, $SnAl_{0.4}B_{0.5}P_{0.5}K_{0.1}O_{3.65}$, $SnAl_{0.4}B_{0.5}P_{0.5}Cs_{0.1}O_{3.65}$, $SnAl_{0.4}B_{0.5}P_{0.5}K_{0.1}Ge_{0.05}O_{3.85}$, $SnAl_{0.4}B_{0.5}P_{0.5}K_{0.1}Mg_{0.1}Ge_{0.02}O_{3.83}$, $SnAl_{0.4}B_{0.4}P_{0.4}Ba_{0.09}O_{2.28}$, $SnAl_{0.5}B_{0.4}P_{0.5}Mg_{0.1}F_{0.2}O_{3.65}$, $SnAl_{0.4}B_{0.5}P_{0.5}Cs_{0.1}Mg_{0.1}F_{0.2}O_{3.65}$, $SnB_{0.5}P_{0.5}Cs_{0.05}Mg_{0.05}F_{0.1}O_{3.03}$, $Sn_{1.1}Al_{0.4}B_{0.4}P_{0.4}Ba_{0.08}O_{3.34}$, $Sn_{1.2}Al_{0.5}B_{0.3}P_{0.4}Cs_{0.2}O_{3.5}$, $SnSi_{0.5}Al_{0.2}B_{0.1}P_{0.1}MG_{0.1}O_{2.8}$, $SnSi_{0.5}Al_{0.3}B_{0.4}P_{0.5}O_{4.30}$, $SnSi_{0.6}Al_{0.1}B_{0.1}P_{0.1}Ba_{0.2}O_{2.95}$, $SnSi_{0.6}Al_{0.4}B_{0.2}Mg_{0.1}O_{3.2}$, $Sn_{0.9}Mn_{0.3}B_{0.4}P_{0.4}Ca_{0.1}Rb_{0.1}O_{2.95}$, $Sn_{0.9}Fe_{0.3}B_{0.4}P_{0.4}Ca_{0.1}Rb_{0.1}O_{2.95}$, $Sn_{0.3}Ge_{0.7}Ba_{0.1}P_{0.9}O_{3.35}$, $Sn_{0.9}Mn_{0.1}Mg_{0.1}P_{0.9}O_{3.35}$, and $Sn_{0.2}Mn_{0.8}Mg_{0.1}P_{0.9}O_{3.35}$.

The negative electrode material may contain light metal, particularly lithium. Lithium is preferably added electrochemically, chemically or thermally.

The amount of lithium added to the negative electrode material approximately corresponds to a lithium deposition potential. Lithium of 50 to 700 mol % is preferably added to the negative electrode material. Lithium of 100 to 600 mol % is more preferable.

The conductivity-imparting agent for positive and negative electrodes may be graphite, acetylene black, carbon black, ketchen black, carbon fibers, metal powders, metal fibers or polyphenylene derivatives. Of these materials, graphite and acetylene black are particularly preferred.

The binder for positive and negative electrodes may be polyacrylic acid, carboxymethyl cellulose, polytetrafluoroethylene, polyvinylidene fluoride, polyvinyl alcohol, starch, regenerated cellulose, diacetyl cellulose, hydroxypropyl cellulose, polyvinyl chloride, polyvinyl pyrrolidone, polyethylene, polypropylene, styrene-butadiene rubber (SBR), etylene-propylene-diene methylene linkage (EPDM), sulfonated EPDM, fluororubber, polybutadiene or polyethlene oxide. Of these materials, polyacrylic acid, carboxymethyl cellulose, polytetrafluoroethylene and polyvinylidene fluoride are particularly preferred.

Materials for supports or current collectors of the positive and negative electrodes may be aluminum, stainless steel, nickel, titanium or alloys thereof, for the positive electrode, and copper, stainless steel, nickel, titanium or alloys thereof, for the negative electrode. The support may have a shape such as a foil, expanded metal, punching metal or net. In particular, preferred are an aluminum foil for the positive electrode and a copper foil for the negative electrode.

The separator may be any insulating thin film having a high ion-permeability and desired mechanical strength and examples of materials for the separator include olefine polymers, fluoropolymers, cellulosic polymers, polyimides, polyamides, glass fibers and alumina fibers which may be used in the form of nonwoven fabrics, woven fabrics and microporous films. In particular, preferred materials are polypropylene, polyethylene, mixture of polypropylene and Teflon (registered trademark) and mixture of polyethylene and Teflon and preferred shapes of the separator include microporous films. Particularly preferred are microporous films each having a pore size ranging from 0.01 to 10 μm and a thickness ranging from 5 to 50 μm.

The electrolytes usable therein are those obtained by dissolving at least one electrolyte selected from the group consisting of $LiClO_4$, $LiBF_4$, $LiPF_6$, $LiCF_3SO_3$, $LiCF_3CO_2$, $LiAsF_6$, $LiSbF_6$, $LiB_{10}Cl_{10}$, lithium salts of lower aliphatic carboxylic acids, $LiAlCl_4$, LiCl, LiBr, LiI, chloroborane lithium salt and lithium tetraphenylborate in an organic solvent comprising at least one member selected from the group consisting of propylene carbonate, ethylene carbonate, butylene carbonate, dimethyl carbonate, diethyl carbonate, 1,2-dimethoxyethane, γ-butyrolactone, tetrahydrofuran, 2-methyl tetrahydrofuran, dimethylsulfoxide, dioxolan, 1,3-dioxolan, formamide, dimethylformamide, nitromethane, acetonitrile, methyl formate, methyl acetate, methyl propionate, phosphoric acid triesters, trimethoxymethane, dioxolan derivatives, sulfolane, 3-methyl-2-oxazolidinone, propylene carbonate derivatives, tetrahydrofuran derivatives, diethyl ether and 1,3-propanesultone. Preferred are those obtained by dissolving $LiCF_3SO_3$, $LiClO_4$, $LiBF_4$ and/or $LiPF_6$ in a mixed solvent comprising propylene carbonate or ethylene carbonate and 1,2-dimethoxyethane and/or diethyl carbonate and, in particular, the electrolyte preferably comprises at least ethylene carbonate and $LiPF_6$.

The cell may have any shape such as a button, coin, sheet, cylinder or square. If the cell is in a coin or button-like shape, the depolarizing mixes of positive and negative electrode active materials are principally used after compressing them into pellets. On the other hand, if the cell is in a sheet, cylinder, or square shape, the depolarizing mixes of positive and negative electrode active materials are principally used by coating them on a current corrector, drying and then compressing. The cell is formed by inserting the pellet or sheet type electrodes wound with the separator into the can, electrically connecting the can and the electrodes, permeating electrolyte, and sealing the can. The cell is preferably provided with means for ensuring safety even during malfunction, such as a current cutoff mechanism and an internal pressure releasing explosion-proof valve.

Materials for the can of a cell having the bottom may be, for instance, nickel-plated steel plates, stainless steel plates (such as SUS 304, SUS 304L, SUS 304N, SUS 316, SUS 316L, SUS 430 and SUS 444), nickel-plated stainless steel plates (such as those listed above), aluminum or alloys thereof, nickel, titanium and copper, which may be in the form of cylinders having a circular-section, elliptic-section, square-section and rectangular-section. In particular, if the can simultaneously serves as a negative terminal, stainless steel plates and nickel-plated steel plates are preferred. While if the can simultaneously serves as a positive terminal, stainless steel plates, aluminum or alloys thereof are preferred.

The gaskets may be those prepared from olefinic polymers, fluoropolymers, cellulosic polymers, polyimides and polyamides, with olefinic polymers and particularly polymers mainly of propylene being preferred because of high resistance to organic solvents and low water-permeability, and block copolymers of propylene and ethylene being more preferred.

The cell is, if necessary, covered with an armoring material. Examples of such armoring materials are heat-shrinkable tubings, adhesive tapes, metal films, paper, cloths, paint and plastic cases. The armor may be partially composed of a portion which undergoes color change upon heating so that the heat history of the cell during use can be monitored.

A plurality of cells are optionally combined in series or parallel and accommodated in a cell-package. The cell package may be provided with a resistor having a positive temperature coefficient, a temperature fuse and safety elements such as a fuse and/or a current cutoff element as well as a safety circuit (i.e., a circuit having functions for monitoring, for instance, the voltage, temperature and current of each cell and/or a cell assembly and, if necessary, a circuit for cutting off the current). In addition, the cell package may comprise, in addition to positive and negative terminals for the entire cell assembly, external terminals such as positive and negative terminals for each cell, temperature-detecting terminals for the cell assembly and/or each cell and a current-detecting terminal for the cell assembly. Moreover, the cell package may comprise a built-in voltage-conversion circuit (such as DC—DC converter). Further, the connection of each cell may be performed by fixing the cell through welding the lead plate thereof or by fixing it through the use of, for instance, a socket so that it is easily removable. Moreover, the cell package may have a function for displaying the remaining capacity thereof, necessity of charging, number of use or the like.

The cell can be used in various apparatuses. In particular, the cell is preferably used in video movies, portable video decks provided with built-in monitors, movie cameras provided with built-in monitors, compact cameras, single-lens reflex cameras, disposable cameras, films provided with lenses, notebook-type personal computers, notebook-type word processors, electronic notebooks, portable telephones, cordless telephones, shavers, motor-driven tools, motor-driven mixers and motorcars.

The present invention will be described in more detail with reference to the following Example. The invention is not restricted to this specific Example, but should include various modifications so far as they are not beyond the scope of the present invention.

The negative electrode was prepared by mixing 86 parts by weight of $SnB_{0.2}P_{0.5}K_{0.1}Mg_{0.1}Ge_{0.1}O_2$ as active material, 3 parts by weight of acetylene black and 6 parts by weight of graphite as conductivity-imparting agents and 4 parts by weight of polyvinylidene fluoride and one part by weight of carboxymethyl cellulose as binders of aqueous dispersion agents having a diameter of 0.2 μm, kneading the mixture together with water as a medium to give a slurry, then applying the slurry onto both sides of a copper foil (current collector, thickness: 18 μm) by an extrusion type coater, drying the coated slurry and compression-molding the current collector using a calender press to give a sheet-like negative electrode.

The positive electrode was prepared by mixing 87 parts by weight of $LiCo_2$ as active material, 3 parts by weight of acetylene black and 6 parts by weight of graphite as conductivity-imparting agents and 3 parts by weight of Nipol820B (Nippon Zeon Co., Ltd.) and one part by weight of carboxymethyl cellulose as binders, kneading the mixture together with water as a medium to give a slurry, then applying the slurry onto both sides of an aluminum foil (current collector, thickness: 20 μm) by an extrusion type coater, drying the coated slurry and compression-molding the current corrector using a calender press to give a sheet-like positive electrode.

After lead plates of nickel and aluminum were welded to the ends of the positive and negative electrodes, they were subjected to heat treatment in a low humidity atmosphere at a dew point of −40° C. or lower for one hour at 230° C. The heat treatment was conducted by using a far infrared heater. The heat treated positive electrode, microporous film separator of polyethylene/polypropylene, and heat treated negative electrode and separator were laminated in this order and wound to give an electrode assembly.

This wound electrode assembly was accommodated in a cylindrical closed-end cell can which also serves as the negative electrode terminal, has a circular section, and is made of a nickel-plated steel. Electrolyte was permeated into the inside of the can, which electrolyte was a 1 mol/l solution of $LiPF_6$ in a 2:8 (volume ratio) mixed solvent of ethylene carbonate and diethyl carbonate. The can was sealed with a terminal cap, as will be detailed below, and a gasket to give a cylindrical cell. The positive electrode terminal was connected to the positive electrode and the can was connected to the negative electrode at earlier steps, by lead terminals.

The terminal cap of the sealing member had Ro of 8.9 mm, Ri of 9.0 mm, So of 165.1 mm$^2$, and Si of 9.0 mm$^2$. The material of the terminal cap was a nickel-plated iron plate of 0.4 mm thick.

The cell was overcharged to 4.4 V at a current density of 5 mA/cm$^2$, the cell having an ordinary final charge voltage of 4.1 V. This charged cell underwent a high temperature to perform a thrust force test. The cell was placed on a hot plate of 40 cm diameter and the temperature was raised from 25° C. to 200° C. Fifty cells were tested and the cells ejected gas at the high temperature. However, none of the cells jumped above the hot plate. It has been proved that the cell of this invention has no thrust force even if its internal pressure rises by abnormality.

The present invention has been described in connection with the preferred embodiments. The invention is not limited only to the above embodiments. It is apparent that various modifications, improvements, combinations, and the like can be made by those skilled in the art.

I claim:

1. A terminal cap for a cylinder type non-aqueous secondary cell, the terminal cap having a projection and a flange integrally formed, a side wall of the projection being formed with openings, each opening is defined by the following equation:

$$P=(Ro-Ri)/Ro$$

where P is set in the range of $-0.1 \leq P \leq +0.3$, Ro is a diameter of a circle composed of sides of the openings on the side of the top surface of the projection and Ri is a diameter of a circle composed of sides of the openings on the side of the flange, respectively when the sides are projected along the direction vertical to the surface of the flange.

2. A terminal cap according to claim 1, wherein P is set in the range of $-0.01 \leq P \leq +0.10$.

3. A terminal cap according to claim 1, wherein if the area of the openings when the terminal cap is projected along the horizontal direction is represented by Si and the area of the terminal cap when the terminal cap is projected along the direction vertical to the terminal cap is represented by So, a ratio Q of Si to So is set in the range of $0.03 \leq Q \leq 0.4$.

4. A terminal cap according to claim 1, wherein the terminal cap has at least two openings.

5. A terminal cap according to claim 1, wherein the material of the terminal cap is nickel-plated iron or stainless steel.

6. A terminal cap according to claim 2, wherein if the area of the openings when the terminal cap is projected along the horizontal direction is represented by Si and the area of the terminal cap when the terminal cap is projected along the direction vertical to the terminal cap is represented by So, a ratio Q of Si to So is set in the range of $0.03 \leq Q \leq 0.4$.

7. A terminal cap according to claim 3, wherein the ratio Q is set in the range of $0.04 \leq Q \leq 0.1$.

8. A terminal cap according to claim 3, wherein at least two openings are provided.

9. A terminal cap according to claim 3, wherein the material of the terminal cap is nickel-plated iron or stainless steel.

10. A terminal cap according to claim 4, wherein the plurality of openings are disposed in rotation symmetry.

11. A terminal cap according to claim 6, wherein the ratio Q is set in the range of $0.04 \leq Q \leq 0.1$.

12. A cylinder type non-aqueous secondary cell comprising:

an electrode group including a positive electrode, a negative electrode and a separator wound together;

non-aqueous electrolyte;

a can for accommodating said electrode group and said non-aqueous electrolyte; and a sealing member inclusive of a terminal cap for sealing an open end of said can, said terminal cap having a projection and a flange integrally formed, a side wall of the projection being formed with openings, each opening is defined by the following equation:

$$P=(Ro-Ri)/Ro$$

where P is set in the range of $-0.1 \leq P \leq +0.3$, Ro is a diameter of a circle composed of sides of the openings on the side of the top surface of the projection and Ri is a diameter of a circle composed of sides of the openings on the side of the flange, respectively when the sides are projected along the direction vertical to the surface of the flange.

13. A cylinder type non-aqueous secondary cell according to claim 12, wherein said sealing member further comprises a positive temperature coefficient element, a current cutoff element and an explosion-proof valve.

* * * * *